US005636657A

United States Patent [19]

Degenkolbe et al.

[11] Patent Number: 5,636,657

[45] Date of Patent: Jun. 10, 1997

[54] TAP HEAD FOR BEVERAGE CONTAINERS OR BARRELS

[75] Inventors: Horst Degenkolbe, Nörvenich; Detlef Obier, Eschweiler, both of Germany

[73] Assignee: D.S.I. Josef Breitwisch & Co. GmbH, Germany

[21] Appl. No.: 557,133

[22] PCT Filed: May 6, 1994

[86] PCT No.: PCT/EP94/01477

§ 371 Date: Nov. 9, 1995

§ 102(e) Date: Nov. 9, 1995

[87] PCT Pub. No.: WO94/26653

PCT Pub. Date: Nov. 24, 1994

[30] Foreign Application Priority Data

May 17, 1993 [DE] Germany .......................... 43 16 457.9

[51] Int. Cl.[6] .................................................... F16K 24/04

[52] U.S. Cl. ........................ 137/212; 222/397; 222/400.7

[58] Field of Search ............................ 137/212; 222/397, 222/400.7

[56] References Cited

U.S. PATENT DOCUMENTS

| | | | |
|---|---|---|---|
| 3,687,340 | 8/1972 | De La Hunt | 222/400.7 |
| 4,728,010 | 3/1988 | Johnston | 137/212 |

FOREIGN PATENT DOCUMENTS

| | | | |
|---|---|---|---|
| 432650 | 6/1991 | European Pat. Off. | 137/212 |

*Primary Examiner*—Gerald A. Michalsky

*Attorney, Agent, or Firm*—Diller, Ramik & Wight, PC

[57] ABSTRACT

A tap head for beverage containers or barrels includes a tap head plunger which is actuated by a hand lever. A beverage connection is connected to a source of gaseous pressure, such as $CO_2$, and a relief valve is connected to an interior of the tap head with the tap head plunger having a flange. When the hand lever is raised, the relief valve is opened forcefully by way of the tap head plunger through the tap head plunger valve.

3 Claims, 3 Drawing Sheets

TAP HEAD FOR BEVERAGE CONTAINERS OR BARRELS

BACKGROUND OF THE INVENTION

The invention relates to a tap head for beverage containers or barrels including a tap head plunger capable of being actuated by a hand lever, a beverage connection, a connection for a gaseous pressure medium, a container connection, and a relief valve being connected to the interior of the tap head.

Tap heads of this type serve in known manner for the removal of beverages from beverage containers or beverage barrels, such as beer barrels. For this purpose, the tap head with the said connections is connected to the flange of a fitting with the hand lever raised. The fitting represents the container connection located in a container opening, which is equipped with a particular, known valve. By pulling down the hand lever of the tap head and thus by actuating the tap head plunger, a plunger flange located on this plunger is pressed against a housing gasket and simultaneously the valve of the fitting is opened, so that a gastight connection is guaranteed. Pressurized gas flows through the interior around the tap head plunger into the container and conveys the beverage through a central pipe to the beverage connection and from there by way of a line to the actual bar dispenser.

After emptying the container, the hand lever of the tap head is tilted upwards, so that the compression of the housing gasket is discontinued and the fitting in the housing barrel is again closed.

One considerable problem consists in that particularly at a higher work pressure in the interior of the tap head, particularly in the lower cavity around the tap head plunger, a gas pressure is maintained which may reach up to approximately 6 bars. Due to this, the housing gasket of the tap head is pressed against the flange of the fitting. The drawback consists in that the tap head can only be released from the flange by overcoming the adhesion produced by the gas pressure, which signifies not solely a considerable application of force, but also a certain danger for the operator.

The problem mentioned previously can be obviated at least partially in a tap head mentioned at the beginning, which is known from the document EP-A-0 432 650. The pressure relief valve is however in this case arranged pointing approximately radially outwards on the tap head housing, so that in its direction of movement, the valve plunger located in the valve housing extends substantially at right angles to the direction of movement of the tap head plunger. The pressure relief valve serves for the ventilation of the storage container and must be actuated in each case manually, for example by means of a hand lever. If the storage container is to be ventilated, the keg fitting must be opened. It is moreover also conceivable, in the closed state, by manually actuating the pressure relief valve, to ventilate solely the interior of the tap head housing.

SUMMARY OF THE INVENTION

It is accordingly the object of the invention, whilst preserving the advantages of the arrangement of a pressure relief valve assumed to be in accordance with the known type, to provide a tap head, in which, automatically after each closure process, a relief of the pressure takes place in the interior of the tap head, without requiring any additional manual actuations.

Based on the tap head mentioned at the beginning, the object set is achieved according to the invention due to the fact that the tap head plunger is provided with a flange and that the relief valve is constructed and arranged so that when the hand lever is raised, the relief valve is opened forcibly by way of the tap head plunger moving upwards due to this, by its flange.

DESCRIPTION OF THE PREFERRED EMBODIMENT

Figure 1:
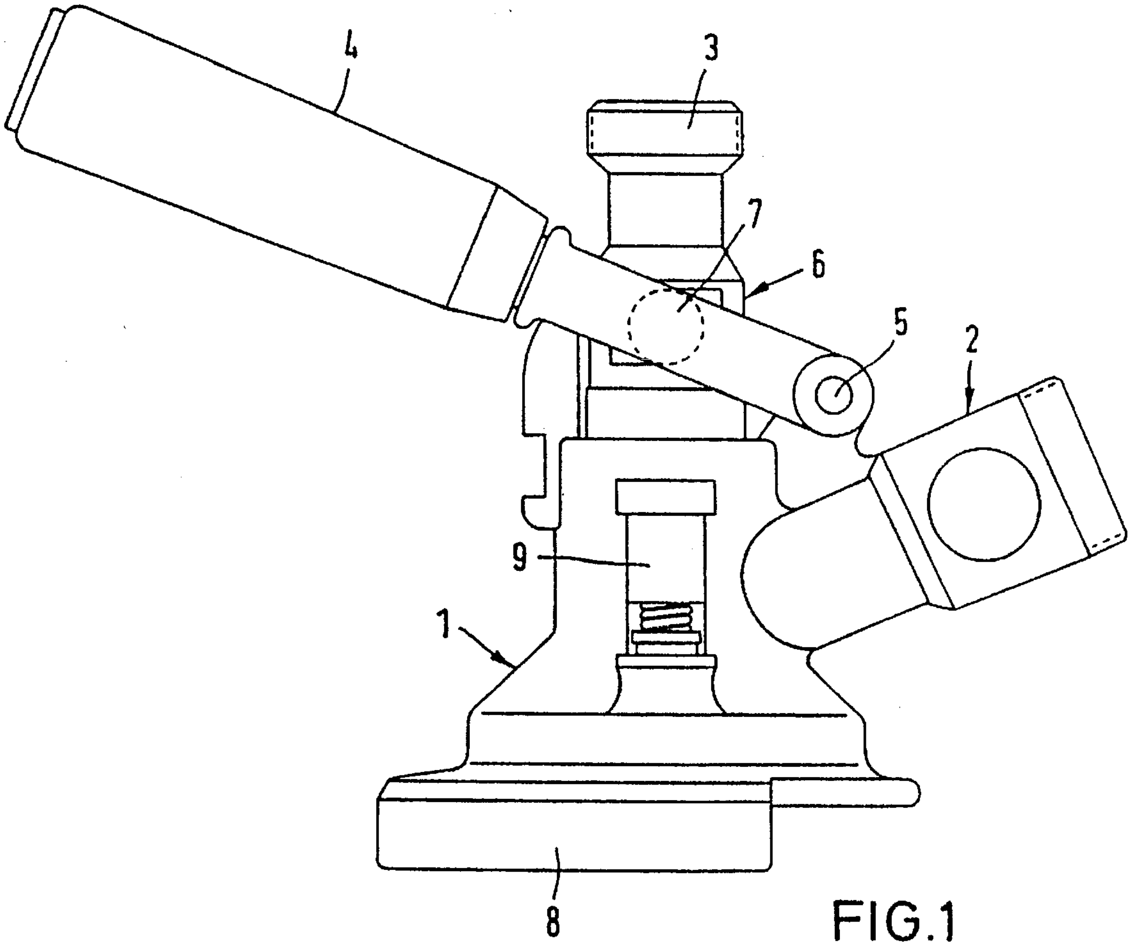
FIG. 1 is a side view of a tap head.

In FIG. 1 a tap head 1 includes a connection 2 for a gaseous pressure medium, for which carbon dioxide ($CO_2$) is normally used. Furthermore, the tap head 1 comprises a beverage connection 3 as well as a container connection 8 for connection to the fitting seated in the container opening and which is not shown. The tap head also comprises a hand lever 4 for actuating the tap head plunger 6. The hand lever is mounted in the swivel bearing 5 and comprises pivots 7 known per se, on both sides of the tap head plunger. FIG. 1 also shows a relief valve 9 in the correct lateral position, namely at an angle of 90° with respect to the pressure medium connection 2.

Figure 2:
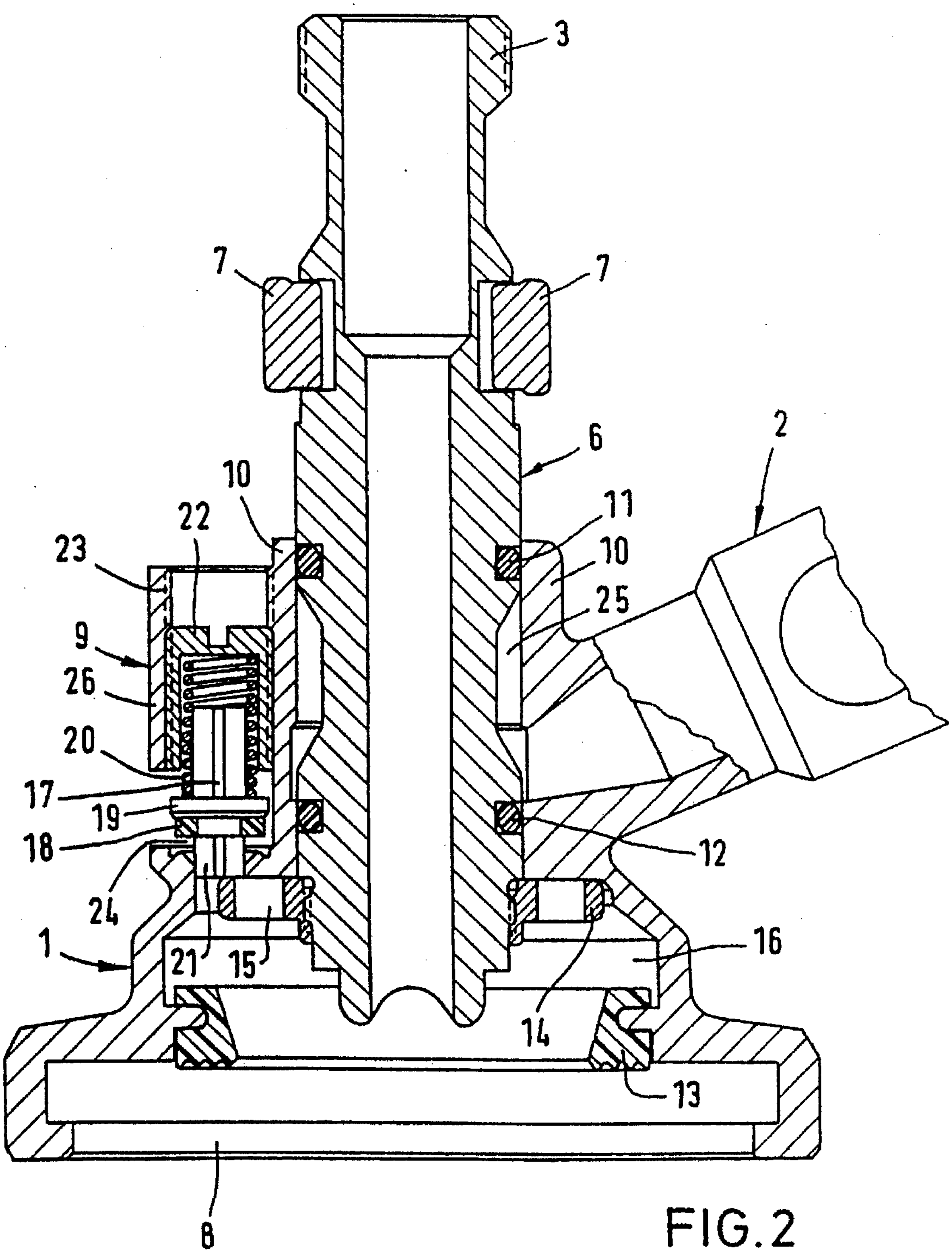
FIG. 2 is a vertical section through the tap head according to FIG. 1, the relief valve being shown tilted through 90° about the central axis in the plane of the drawing.
Figure 3:
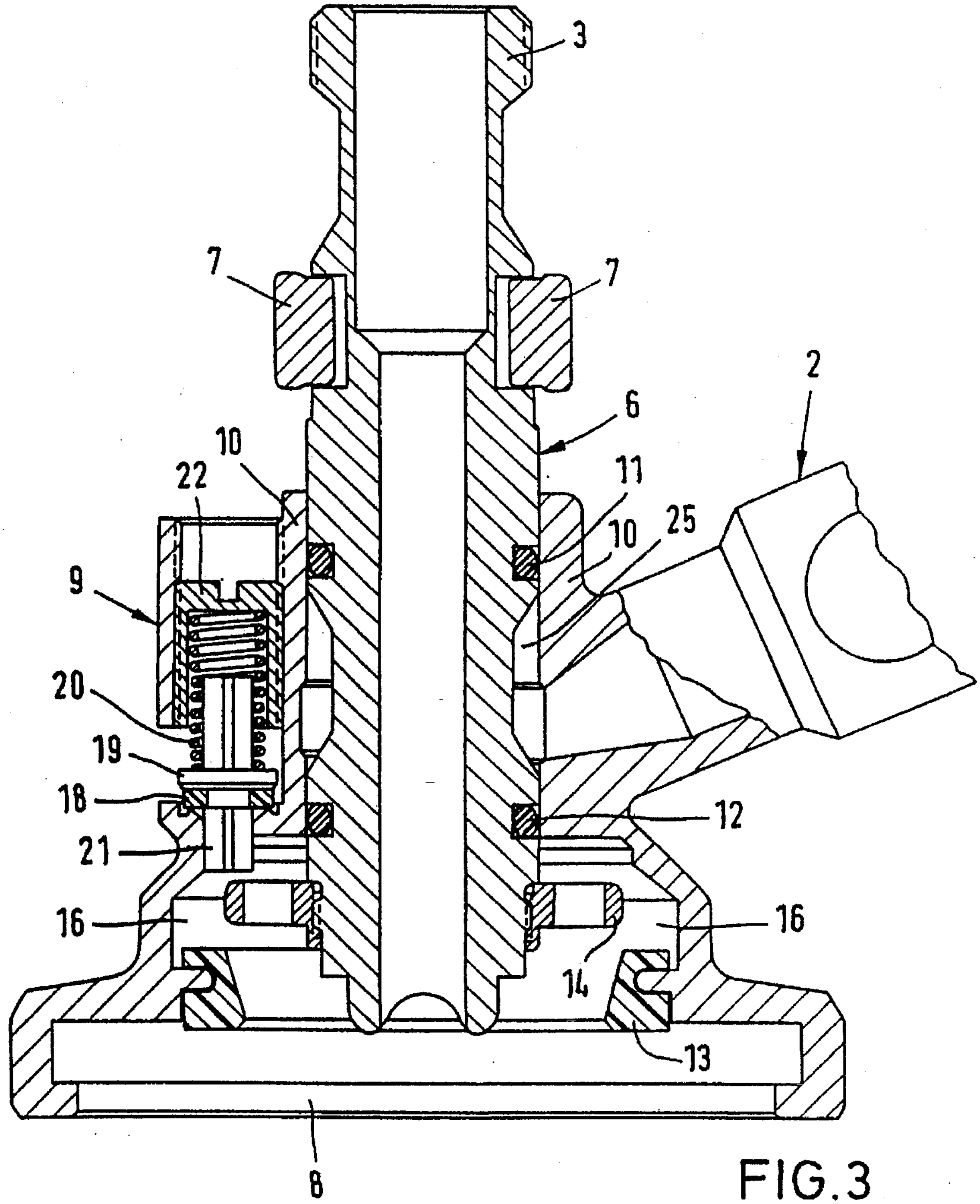
FIG. 3 is a vertical section according to FIG. 2, and illustrates the tap head plunger being located in a central vertical position.

As can be seen from FIGS. 2 and 3, the relief valve 9 comprises a valve housing 26, which is attached laterally to the tap head housing wall 10. Able to slide vertically in the valve housing 26 is a valve plunger 17 together with a flange 19 seated thereon and with a lower projection 21. Inserted between the flange 19 and an adjustable screw 22 is a compression spring 20, which normally ensures that the flange 19 presses against a gasket ring 18 located below the flange, which gasket ring 18 in turn seals an opening in the tap head housing wall 10, and indeed in the region of the projection 21. The adjustability of the screw 22 able to be screwed in the internal screw thread 23 of the valve housing 26 is arranged so that the spring pressure can be adjusted or regulated in accordance with the situation.

Two gasket rings 11 and 12, in practice so-called O-rings, are provided between the tap head plunger 6 and the tap head housing wall 10. Furthermore, a further gasket ring 13 is inserted in the lower part of the tap head. A flange 14 provided with openings 15 for the passage of gas is located, preferably screwed to the lower part of the tap head plunger. In the region of the tap head housing wall 10, the tap head plunger 6 comprises recesses 25 in the region between the two sealing rings 11 and 12, which recesses allow the passage of gas downwards, in the lowermost position of the tap head plunger. The reference numeral 16 designates the interior of the tap head, to which the relief valve 9 is connected. The efficiency of the relief valve is further increased due to the fact that the lower projection 21 has an approximately triangular or star-shaped cross-section.

The method of operation is essentially as follows.

When the hand lever 4 is swung upwards, the tap head plunger 6 is brought into the uppermost position according to FIG. 2. In this case the relief valve 9 is automatically actuated and indeed due to the fact that the flange 14 presses against the lower end of the projection 21, so that with this the relief valve is opened and the gas pressure is able to escape from the tap head interior 16 through the spaces into the projection 21 and through the resulting gas outlet gap 24 on the under side of the gasket ring 18 towards the outside.

FIG. 3 shows a central vertical position of the tap head plunger 6. In a lower position which is not shown, in which the aforedescribed opening of the container takes place, the flange 14 presses against the gasket ring 13. In one of the said central positions and in the lowermost position of the tap plunger 6, the relief valve 9 is permanently closed due to the pressure of the compression spring 20. However, the automatically acting relief valve 9 also fulfils a safety function, namely if an inadmissibly high excess pressure prevails in the beverage container or in the compressed gas supply. The compression spring 20 may be adjusted by means of the screw 22, which above all is fixed in practice, so that the relief valve opens automatically at the time of such an inadmissibly high pressure.

We claim:

1. Tap head (1) for beverage containers or barrels, with a tap head plunger (6) able to be actuated by a hand lever (4), a beverage connection (3), a connection (2) for a gaseous pressure medium ($CO_2$) and a container connection (8), a relief valve (9) being connected to the interior (16) of the tap head, characterised in that the tap head plunger (6) is provided with a flange (14) and that the relief valve (9) is constructed and arranged so that when the hand lever (4) is raised, the relief valve (9) is opened forcibly by way of the tap head plunger (6) moving upwards due to this, by its flange (14).

2. Tap head according to claim 1, characterised in that the relief valve (9) comprises a valve housing (26), which is fastened laterally to the tap head housing wall (10), a valve plunger (17) with a flange (19), a compression spring (20) inserted between the flange (19) and an adjustable screw (22), a gasket ring (18) and a triangular projection (21).

3. Tap head according to claims 1 or 2, characterised in that the flange (14) provided on the tap head plunger (6) comprises openings (15) for the passage of gas.

* * * * *